United States Patent
Ali et al.

(10) Patent No.: US 9,549,027 B2
(45) Date of Patent: Jan. 17, 2017

(54) NETWORK-SYNCHRONIZED MEDIA PLAYBACK

(71) Applicant: Dolby Laboratories Licensing Corporation, San Francisco, CA (US)

(72) Inventors: Arshad Ali, Union City, CA (US); Gregory Buschek, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 260 days.

(21) Appl. No.: 14/449,209

(22) Filed: Aug. 1, 2014

(65) Prior Publication Data
US 2015/0095512 A1   Apr. 2, 2015

Related U.S. Application Data

(60) Provisional application No. 61/883,322, filed on Sep. 27, 2013.

(51) Int. Cl.
*H04L 29/06* (2006.01)
*H04L 29/08* (2006.01)
(Continued)

(52) U.S. Cl.
CPC ............. *H04L 67/125* (2013.01); *H04L 69/28* (2013.01); *H04N 21/4305* (2013.01);
(Continued)

(58) Field of Classification Search
CPC  H04N 21/00; H04N 21/6371; H04N 21/4307; H04N 21/4333; H04N 21/43615; H04N 21/4305; H04J 3/0667; H04L 67/125; H04L 69/28
(Continued)

(56) References Cited

U.S. PATENT DOCUMENTS 7,439,936 B2 *  10/2008  Kinugasa .............. G06F 3/1423
                                                    345/1.1
7,849,145 B2    12/2010  Kang
(Continued)

FOREIGN PATENT DOCUMENTS

WO     2007/016032     2/2007

OTHER PUBLICATIONS

Gupta, S. et al "P2P Video Synchronization in a Collaborative Virtual Environment" 4th International Conference, Hong Kong, China, Jul. 31-Aug. 3, 2005, pp. 86-98, published by Springer Berlin Heidelberg.

(Continued)

*Primary Examiner* — Tu Nguyen

(57) ABSTRACT

In a system that includes two or more computing systems connected to a computer network, a network control and synchronization (NetSync) application controls the in-sync playback of media files across different computing systems in the network, where each computing system is playing a local version of a media file using a local instance of a Media player. The NetSync application receives status messages from all Media players and controls the playback of all media files by sending them playback commands based on the received status messages, so that video playback among the players is in sync with a Master Media player. Alternatively, media playback across all Media players is based on user-entered playback commands, such as Play, Pause, Stop, and the like, entered using either the NetSync application interface or NetSync command scripts.

18 Claims, 2 Drawing Sheets

(51) Int. Cl.
  *H04N 21/43*    (2011.01)
  *H04N 21/436*   (2011.01)
  H04J 3/06       (2006.01)
  H04N 21/433     (2011.01)
  H04N 21/6371    (2011.01)

(52) U.S. Cl.
  CPC ... *H04N 21/4307* (2013.01); *H04N 21/43615* (2013.01); *H04J 3/0667* (2013.01); *H04N 21/4333* (2013.01); *H04N 21/6371* (2013.01)

(58) Field of Classification Search
  USPC ............................................. 709/231
  See application file for complete search history.

(56) References Cited

U.S. PATENT DOCUMENTS

| | | |
|---|---|---|
| 8,245,262 B2 | 8/2012 | Kashyap |
| 8,364,005 B2 | 1/2013 | Lee |
| 2005/0286546 A1 | 12/2005 | Bassoli |
| 2007/0110074 A1 | 5/2007 | Bradley |
| 2009/0100189 A1 | 4/2009 | Bahren |
| 2010/0232771 A1* | 9/2010 | Prestenback ........... H04N 5/765 386/201 |
| 2011/0218656 A1 | 9/2011 | Bishop |
| 2011/0276648 A1 | 11/2011 | Soldan |
| 2013/0124664 A1 | 5/2013 | Fonseca, Jr. |

OTHER PUBLICATIONS

Tweak Software, RV Manual "Synchronizing Multiple RVs" Date Unknown.

\* cited by examiner

NETWORK-SYNCHRONIZED MEDIA PLAYBACK

CROSS REFERENCE TO RELATED APPLICATIONS

This application claims the benefit of priority to U.S. Provisional Patent Application Ser. No. 61/883,322, filed on Sep. 27, 2013, which is incorporated herein by reference in its entirety.

TECHNOLOGY

The present invention relates generally to digital media playback. More particularly, an embodiment of the present invention relates to the synchronized playback of digital audio and visual media across multiple digital media players connected into a computer network.

BACKGROUND

During the content creation process, given a "master" source (e.g., a movie), it is not unusual to generate multiple variations of the master targeting different markets and different playback environments. For example, a studio may generate three versions of a movie: a cinema version, for movie theater projectors, a standard-definition version, for DVD distribution, and a high-definition version, for Blu-Ray distribution. These versions may use different resolutions and different video compression schemes; however, in most cases, they all need to conform to the original artistic intent of the director.

Alternatively, when generating a version for consumer release (e.g., the cinema version), a director may want to experiment, and compare different artistic looks before selecting the final one. Hence, there is a need to compare, typically side-by-side, and in frame sync, multiple versions of the same stream.

As appreciated by the inventors here, it is desirable to develop improved techniques for simultaneous, frame-synchronized, playback of digital media files across multiple media players connected into a computer network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for network-synchronized media playback are described herein. Given two or more media players connected into a computer network, synchronized playback of locally-stored content is controlled via a master control application which exchanges status and command messages with all the media players via the network. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to network-synchronized playback of media files across two or more computing systems connected into a computer network. In a system that comprises two or more Media players, wherein each Media player runs on a separate computing system in the network and decodes and renders for display a local media file, a network control and synchronization (NetSync) application controls the in-sync playback of all media files across the different Media players. The NetSync application receives status messages from all Media players and controls the playback of all media files by sending them playback commands based on the received status messages, so that video playback among the players is in sync (that is, within a predefined drift threshold from a Master media player). Alternatively, the NetSync control application may send command messages based on user-entered playback commands, such as Play, Pause, Stop, and the like, entered by a user using either the NetSync control interface or a command script.

Example Network-Synchronized Media Playback

Figure 1:
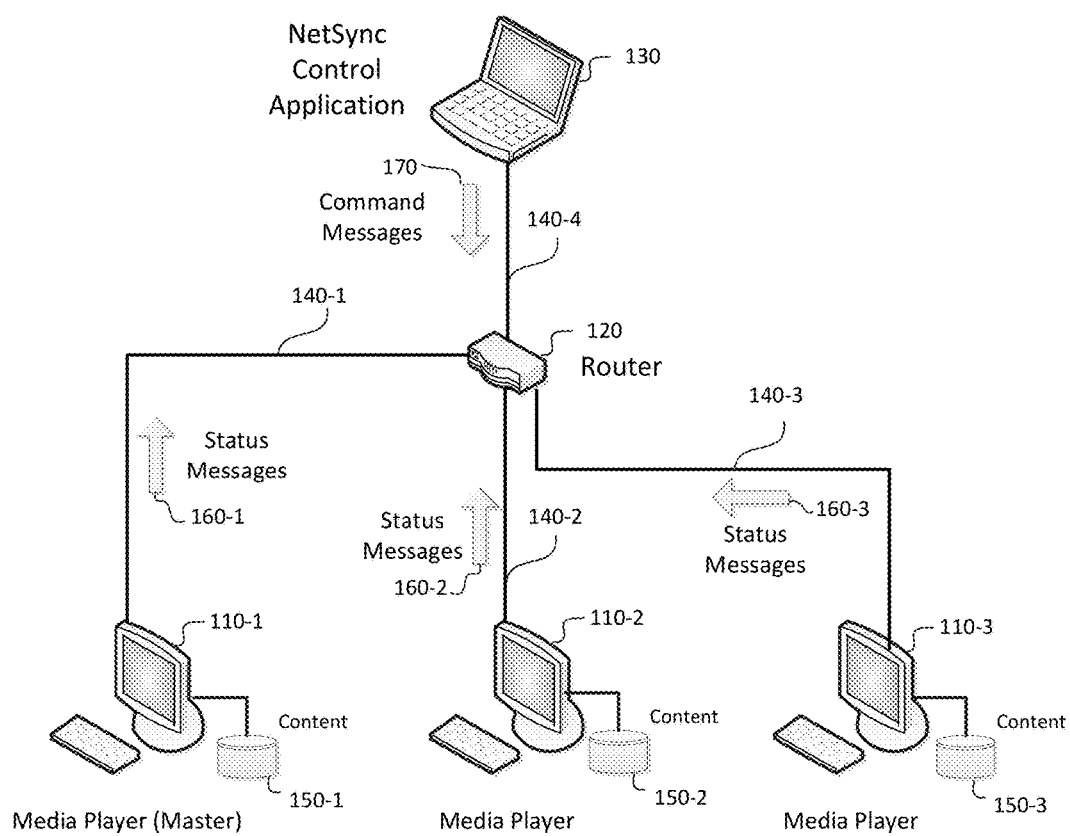
FIG. 1 depicts an example system for network-synchronized media playback according to an embodiment of the present invention.

FIG. 1 depicts an example system for network-synchronized media playback according to an embodiment of the present invention. As depicted in FIG. 1, two or more computing systems (110) are connected into a computer network (140). In an embodiment, each computing system (110) may connect to the network (140) using a networking router or switch (120) through a wired or wireless network interface card (not shown). Each computing system (110) may comprise one or more processors (CPUs) for decoding and rendering the media files, locale storage (150) for storing the content to be played, a video monitor for the display of the video content, and ancillary computer peripherals, such as audio speakers, keyboard and mouse, and the like. For example, in an embodiment, a media player (110) may comprise a personal computer connected to a high-definition monitor via an HDMI interface. In some embodiments, media files may also be stored in network drives connected to the network.

In an embodiment, network-synchronized media playback is enabled via a network control and synchronization application, to be referred to from now on, without loss of generality, as the NetSync control application. The NetSync application allows two or more instances of a Media player application (running on separate computing systems, say 110-1 and 110-2) to play media files in-sync. A typical media file comprises a video elementary stream, an audio elementary stream, and ancillary data. A video elementary stream comprises video frames. As used herein, the term "in-sync" denotes that during video playback the two players will play corresponding video frames of their media files approximately at the same time (or in sync); that is, video playback will not drift by more than a predetermined time (e.g., the time to display a video frame). For example, for media playback at 30 frames per second, a new frame is played approximately every 33 ms, hence a desired drift threshold may be set between 33 ms and 50 ms. Similarly, for media playback at 60 frames per second, a desired drift threshold may be set between 16 ms and 40 ms.

As depicted in FIG. 1, in a preferred embodiment, the NetSync application may run on a separate computing system (130) in the network; however, in other embodiments, the NetSync application may run in any of the computing systems (110) connected to the network (140).

Computing systems (110) may all be in the same location (e.g., a video editing Lab) or in separate locations; however, they all are connected to a computer network so that any player can receive or send packets of information and control from/to any other player and the NetSync control application.

In an embodiment, each computing system (110) runs a local instance of a Media player. As used herein, the term "Media player" denotes a software application running on a computing system and capable of accessing a local media stream, decoding it, and rendering it on a local display. Each Media player may open and play various kinds of media formats or containers, such as mp4, ultra-violet, wmv, and the like. A Media player may also support a variety of audio and video codecs, such as Dolby audio, DD+ audio, TrueHD audio, MPEG-2 audio or video, MPEG-4 video, H.264 video, and the like. Trick-mode commands allow a user to perform a variety of trick modes, such as start play, pause, fast forward, reverse, and the like. Each Media player may operate in stand-alone mode, where media playback is controlled by user commands entered using the Media player interface, or in network-sync mode, where media playback is controlled by commands received by the NetSync control application in the network.

In an embodiment, the NetSync control application may identify all the Net-Sync-compatible Media Player machines connected in the network and denote one of them (e.g., 110-1) as the Master, which means that in an event of a pause or other trick-mode operations, the other players will synchronize to this Master player.

The NetSync control application can be used either in Playlist/Script mode, in which a predetermined list of media files are played automatically, or else it can be used in manual mode. In either case, the NetSync control application sends commands to play, pause, stop, skip, etc. to the Media player applications running on computing systems (110). As noted above, the media files reside in all the machines that run the media player. The NetSync control application provides the control to play, stop, pause, etc. the local media files, but it does not transmit actual audio or video streams.

As the media files reside in each of the media players, it is possible to play in-sync different media files and compare them side by side. In an embodiment, this is accomplished by creating a macro file in each machine that runs a media player. This macro file is used to translate special formatted command file names (e.g., $File1) to the actual media files accessed by each Media player. Alternative, the NetSync application can instruct a Media player to play a file using its full path and name.

For instance, one can create a simple setup in which one Media player plays high-dynamic range (HDR) content while a second Media player plays the standard-dynamic rate (SDR) version of same video title. In this example, the NetSync application sends a command to both Media players to play a file with name $File1. The use of the special file name (e.g., $File1) indicates to the Media player to open a macro file (typically stored in a predetermined location) and to translate the macro $File1 name to the actual file name that is stored in the machine or a local network storage drive. Hence, one Media player may play a file with the name movieA_HDR.mp4, representing an HDR version, while a second Media player plays a local file with the name movieA_SDR.mp4, representing an SDR version. To support playlists, where multiple audio video files are played in sequence, a Media Player may have more than one macro file.

In a typical NetSync setup, a user starts first the NetSync control application and then starts the Media player applications on respective computing systems (e.g., PCs). Then the user plays a media file by using the NetSync control application which sends appropriate commands to each of the Media player machines via the network. In an embodiment, one of the instances of the Media player is denoted as the Master. The NetSync control application keeps track of the time of the video frame being displayed in both the Master Media player and the other Media Players and adjusts playback based on the media playback on the Master player.

Figure 2:
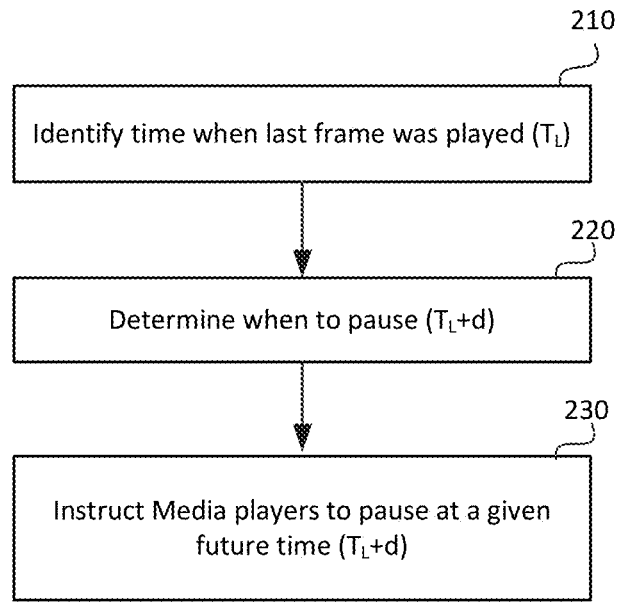
FIG. 2 depicts an example of command messaging (pause play) according to an embodiment of the present invention.

For example, FIG. 2 depicts an example of command messaging (e.g., Pause play) according to an embodiment. As will be explained further later, during playback, each Media player transmits to the NetSync controller a status message (160) that includes, its ID, its local system control time (e.g., $T_{iL}$) and a time stamp of the last frame being displayed. When a user presses the Pause button on the NetSync control application, in step (210), the NetSync application uses this information to identify the time when the last frame was played on the Master player, say $T_L$. Next, in step (220), it determines a future time when all instances of the Media Player applications should pause, for example, by adding to $T_L$ a small positive delta (e.g., d=10 to 20 ms) to compensate for network latency. Finally, in step (230), it sends a command message (170) to pause, along with this new time (e.g., $T_L$+d) when this command needs to be executed, to all the instances of the Media player in the network.

All the instances of Media player (including the Master instance) receive the pause command from the NetSync control application as a multi-cast packet. Each player then pauses when it reaches the time for Pause as given by the NetSync application (e.g., $T_L$+d). Under this scheme, all the instances of the Media player application are independently playing a local media file using their own clocks inside the respective computing systems. There is no other scheme to make them synchronized to each other. This may be sufficient for synchronized playback on networks with very low latency or when the media files are relatively short so any drift between two players never exceeds an observable threshold. To avoid any instances when playback drift is objectionable, a correction needs to be made so that players may continue to play in sync to the Master player. Such a scheme is described next.

Network-Synchronized Media Playback

Figure 3:
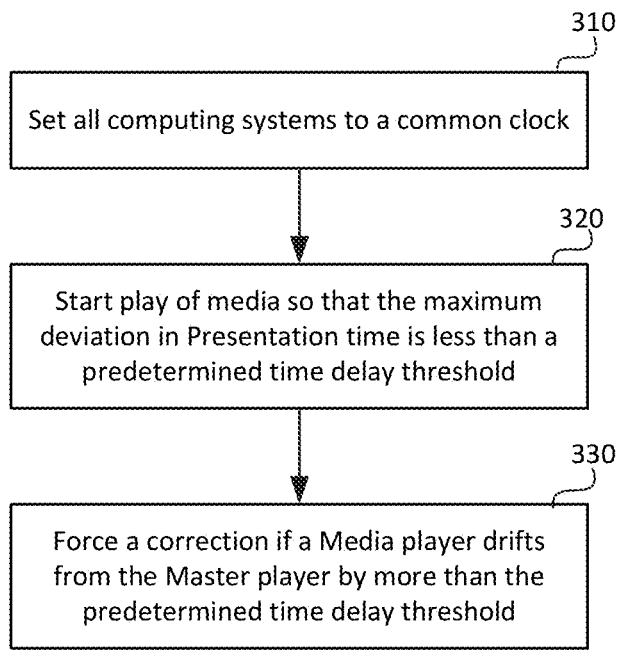
FIG. 3 depicts a flow of operations for network-synchronized playback for two or more media players according to an embodiment of the present invention.

FIG. 3 depicts a flow of operations for network-synchronized playback of two or more media players according to an embodiment. As depicted in FIG. 3, in step (310), prior to any media playback, all computing systems in the network (running both a Media player application and the NetSync control application) are set to a common clock, which is denoted as the System Clock. It is expected that the maximum deviation between the System Clocks of any two processors to be less than 10 ms.

In step (320), each media player starts playback of its own media file so that the maximum deviation in Presentation time between the current frame in the Master player and another player is less than a predetermined time delay (e.g., 30 ms).

If any player drifts by more than the predetermined time delay, then an active correction is made (step 330).

In an embodiment, all processors may be synchronized using a Time Server and the Network Time Protocol (NTP). The Time Server may be any of the computing systems running the Media player or the NetSync control application, or a dedicated server. The NTP protocol provides time in a granularity of a second and there is always some time latency as well. In a preferred embodiment, a local machine is setup to act as the NTP server and time adjustment is done using multiple samples. This way, all computing systems may generate a System Clock within 10 ms of each other. All commands and messages passed between the Media players and the NetSync application carry a time stamp with the transmitting processor's System clock at the time of transmitting the message.

If any processor, running either a Media player or NetSync control, receive a message or a command with time stamp which is off by more than the predetermined delay (e.g., about 30 ms, or the time corresponding to a frame delay), then a message is generated requesting to repeat the System Clock setting step (310). This way, any drift in the System Clock is detected and corrected.

Media playback commands such as Play, Stop, Pause, Skip, and the like, are all generated by the NetSync control application. These commands include a field called, "Effective Time", which indicates a time in the future when the command is to be executed by each of the Media player applications. In an embodiment, the effective-time field is the current system clock time plus a small time delay (e.g., 10-20 ms) to cover network latency.

All instances of the Media players execute playback commands when their respective System Clock reaches or passes the effective time. This way, all the instances of the Media players start playback at the same time with a very little variation which could not be noticeable and it is expected to be less than 5 ms in a typical private network.

A drift in synchronization can happen for many reasons during playback in a Media player. It is usually noticeable if this drift is larger than one or two video frames. The following scheme attempts to correct media playback when such a drift is detected. During the playback, all the instances of Media players send status messages (160) to the NetSync control application. A status message includes the current system clock time stamp and a time location or time stamp of the frame being displayed on the screen of the computing system where the Media player is running. This frame time stamp may actually be the Presentation Time Stamp (PTS) as given in a coded media container file (e.g., mp4 or wmv). In case this presentation time stamp is not available, then a pseudo frame-time stamp is generated using the frame rate information of the video stream. The NetSync control application keeps track of all the packets received. In the event that a difference in frame time stamps is detected when compared with the instance of the Master Media player, an appropriate command to adjust video frame display is issued to the Media player that has been drifted. For example, when media playback is faster than the Master Media player, then the Media player may be instructed to repeat a frame using a "skip backward" command. Similarly, when media playback is slower than the Master media player, the Media player may be instructed to skip a frame using a "skip forward" command. This way a drift is corrected during playback.

In a typical setup of NetSync, when two or more Media players are in the same room, it is preferred that only one of all these Media Players (e.g., the Master player) play both audio and video streams otherwise a user may experience perceptible errors in the audio stream playback. In an embodiment, whether to play video only or audio and video is controlled by the macro files that interpret NetSync commands.

The proposed network-synchronized media playback is suitable for multiple applications, including, but not limited to, the following scenarios:

Multiple versions of the same master file are compared side by side in a single location. The multiple versions may comprise artistic variations (e.g., different color grading) or coding variations (e.g., different video codecs, resolutions, coding bit rates, luminance dynamic rates, and the like.)

The same video file is transmitted and stored into multiple locations; however, playback control may be performed by a single location and in sync to all locations during an audio or video conferencing call.

Two or more versions of the same file are compared side by side simultaneously in multiple locations; however, overall playback control is controlled by a single location running the NetSync application.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to network-synchronized media playback, such as those described herein. The computer and/or IC may compute any of a variety of parameters or values that relate to network-synchronized media playback as described herein. The network-synchronized media playback embodiments may be implemented in hardware, software, firmware and various combinations thereof.

Certain implementations of the invention comprise computer processors which execute software instructions which cause the processors to perform a method of the invention. For example, one or more processors in a personal computer, a smart phone, or the like may implement methods for network-synchronized media playback as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of non-transitory forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including equivalents of that component and any component which performs the function of the described component (e.g., that is functionally equivalent), including components which are not structurally equivalent to the disclosed structure which performs the function in the illustrated example embodiments of the invention.

Equivalents, Extensions, Alternatives And Miscellaneous

Example embodiments that relate to network-synchronized media playback are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of recited Claims that issue from this application, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a system comprising two or more computing systems connected to a computer network, a method to perform network-synchronized media playback across the two or more computing systems, the method comprising:
    setting the two or more computing systems to approximately the same system clock;
    wherein the two or more computing systems have two or more respective clocks that are set to approximately the same system clock; wherein each of the two or more computing systems has at least one of the two or more respective clocks;
    starting a network control and synchronization (NetSync) application in one of the two or more computing systems to control media playback;
    wherein the NetSync application synchronizes the two or more respective clocks of the two or more computing systems to approximately the same system clock in response to detecting that at least one of the two or more respective clocks of the two or more computing systems drifts more than a threshold time interval from the system clock;
    starting a Master Media player application in a first computing system in the computer network to play a first media file accessed by the first computing system;
    starting a second Media player application in a second computing system in the network to play a second media file accessed by the second computing system;
    receiving by the NetSync application status messages by the Master and second Media players related to the media playback of the first and second media files; and
    controlling by the NetSync application the media playback of the first and second media files on the first and second computing systems in response to either the received status messages or playback commands received by the NetSync application from a user, wherein the first and second media files comprise of video frames that are played by the Master player and the second Media player in sync.

2. The method of claim 1, wherein controlling the media playback using the NetSync application comprises sending a command message to the Master Media player and the second Media player, wherein the command message comprises a playback command field and an effective time field instructing each media player to execute a playback command on or after an effective time in the future.

3. The method of claim 2, wherein the playback command is a Play, Stop, Pause, Skip forward, or Skip backward command.

4. The method of claim 2, wherein the effective time field indicates a time in the future when the playback command is to be executed.

5. The method of claim 4, wherein the time in the future is determined by adding the current system clock time and a predetermined positive delay time.

6. The method of claim 2, wherein a command message is sent by the NetSync application to the Master player and the second media player using a multi-cast network packet.

7. The method of claim 2, wherein the second Media player, in response to receiving a command message by the NetSync application, executes the playback command specified in the playback command field on or after the time specified by the effective time field.

8. The method of claim 1, wherein a status message of a Media player running in the computer network comprises the current system clock time at the computing system running the Media player and a frame time stamp of the frame being displayed at the computing system running the Media Player.

9. The method of claim 8, wherein the frame time stamp of the frame being displayed is based on the Presentation Time Stamp (PTS) of the frame.

10. The method of claim 8, further comprising:
    receiving by the NetSync application a first status message by the Master player with a first frame time stamp for a frame in the first media file in display by the Master player;
    receiving by the NetSync application a second status message by the Master player with a second frame time stamp for a corresponding frame in the second media file in display by the second Media play;
    comparing the first and second frame time stamps; and
    sending a command message by the NetSync application to the second Media player to control the media playback of the second media file if the first and second frame time stamps differ more than a predetermined delay threshold.

11. The method of claim 10, wherein the command message comprises a "Skip forward one frame" command if the second frame time stamp is lower than the first frame time stamp and a "Skip backward one frame" command, or repeat a frame, if the second frame time stamp is larger than the first frame time stamp.

12. The method of claim 1, wherein the first media file and the second media file are representing two different artistic or video coding variations of a master file.

13. The method of claim 12, where video coding variations between the two files may include variations in spatial resolution, video coding format, video coding bit rate, or luminance dynamic range.

14. The method of claim 12, wherein the first media file comprises a high dynamic range (HDR) video of the master file and the second media file comprises a standard dynamic range video of the master file.

15. The method of claim 1, wherein controlling media playback by the NetSync application comprises instructing all Media Players to play a file using a special command file name, wherein the command file name is interpreted locally by each of the Media players according to a local macro definition file.

16. The method of claim 1, wherein setting two or more computing systems to approximately the same system clock comprises synchronizing the system clock of each of the two or more computing systems with a time server using a network time protocol.

17. The method of claim 1, further comprising:
    starting a third Media player application in a third computing system in the network to play a third media file accessed by the third computing system; and
    controlling by the NetSync application the media playback of the third media file on the third computing system, wherein the third media file comprises of video frames that are played in sync with the video frames of the first and second media files.

18. A non-transitory computer-readable storage medium having stored thereon computer-executable instructions for executing a method with a processor in accordance with claim 1.

* * * * *